July 7, 1931.  C. J. SCUDDER  1,813,712

LOCOMOTIVE DRIVING BOX CELLAR

Filed April 15, 1929

Inventor
Charles J. Scudder
By Johnston & Jennings
Attorneys

Patented July 7, 1931

1,813,712

UNITED STATES PATENT OFFICE

CHARLES J. SCUDDER, OF SCRANTON, PENNSYLVANIA

LOCOMOTIVE DRIVING BOX CELLAR

Application filed April 15, 1929. Serial No. 355,353.

My invention relates to locomotive driving box cellars and has for its object the provision of a device of the character designated which shall embody integral journal bearing means, together with improved means for distributing lubricant to the locomotive journal bearings and which shall be simple of design, economical of manufacture, and easy of application and adjustment.

A further object of my invention is to provide a locomotive driving box cellar with integral journal under bearings, and an integral hub wear plate together with simple effective means for adjusting the position of the bearings with respect to the locomotive journal.

Briefly, my invention comprises a driving box cellar having integral upwardly extending side portions upon which are formed journal under bearings. The cellar is provided with the conventional force feed grease lubricator and the under bearings are provided with divergent grooves, the better to distribute the grease to the bearings. The cellar is supported by means of wedges bearing against shoulders formed on the cellar and resting on the sides of longitudinal grooves or ledges formed in the sides of the driving box. The wedges are adjustable so as to bring the under bearings up into snug contact with the lower edges of the driving box crown brass so as to form a snug unitary bearing embracing the major portion of the journal. Formed on the outer end of the cellar is a hub wear plate lying in the same plane with the usual hub plate on the driving box face which former serves to afford additional bearing surface for the driving wheel hub and to aid in distributing lubricant to said hub.

Figure 1:
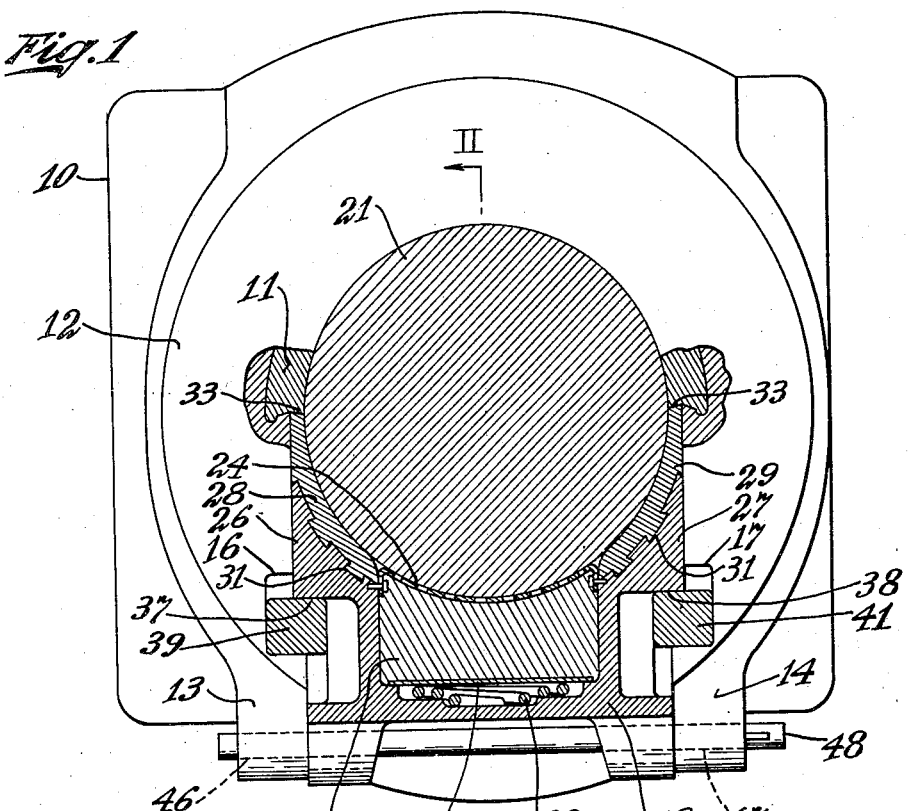
Figure 2:
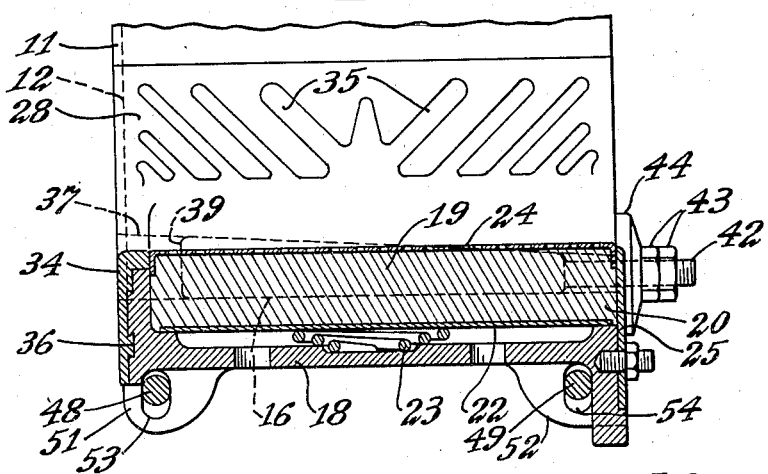

Apparatus embodying features of my invention is illustrated in the accompanying drawings, forming a part of this application, wherein Fig. 1 is an end elevational view partly in section showing my improved cellar as applied to a locomotive driving box; and Fig. 2 is a sectional view taken along the line II—II of Fig. 1;

Referring to the drawings for a better understanding of my invention, I show a locomotive driving box 10 having the usual journal crown brass 11 and provided with the conventional hub wear plate 12. The driving box has the usual depending jaws 13 and 14 in which are provided longitudinal grooves 16 and 17.

My improved driving box cellar is indicated generally by the numeral 18 and comprises a box like structure for receiving a grease cake 19 which is pressed upwardly toward the locomotive journal 21 by means of a follower plate 22 and a spring 23, the latter being located in the bottom of the cellar 18. Extending across the top of the cellar 18 and curved to conform to the contour of the journal 21 is a perforated plate 24 through which the grease feeds when the locomotive is in operation. The inner end of the cellar 18 is provided with an opening 20 covered by a plate 25 through which grease may be supplied to the cellar.

My improved cellar 18 is provided with upwardly extending sides 26 and 27 upon which are formed journal under bearings 28 and 29. In carrying out my invention, I prefer to make the cellar 18 in the form of a skeleton of steel and pour the under bearings 28 and 29 on the skeleton, said under bearings being formed from some suitable bearing metal such as brass and the skeleton being provided with dove tail grooves, such as 31, into which the molten metal runs when the pouring is taking place and thus serve to unite the bearings integrally with the cellar skeleton. The upper edges 32 and 33 of the under bearings are machined or filed to fit snugly against the lower edges of the crown brass 11.

The under bearings 28 and 29 are provided with a plurality of divergent grooves 35 to distribute the grease to the bearings. On the outer end of the cellar 18 is formed a hub wear plate 34, lying in the same vertical plane with the hub plate 12 and preferably formed integrally with the under bearings 28 and 29 and of course poured simultaneously with said under bearings. The outer end of the cellar is formed with dove tail grooves such as 36 for receiving the material of the wear plate 34 when it is being poured, thus firmly locking it with the steel skeleton of the cellar.

The outer sides of the cellar 18 are provided with shoulders 37 and 38 adjacent the grooves 16 and 17. Disposed within the grooves 16 and 17 are longitudinally extending wedges 39 and 41 which support the cellar 18. Formed on the inner end of each of the wedges 39 and 41 is a round threaded end 42 carrying adjusting nuts 43 by means of which the wedges may be drawn longitudinally to bring the upper edges of the under bearings 28 and 29 into snug contact with the lower edges of the crown brass 11. A washer 44 is interposed between the nuts 43 and the cellar 18 and driving box 10.

The lower jaws 13 and 14 of the driving box 10 are provided with holes 46 and 47 through which pass transversely extending cellar bolts 48 and 49. The cellar 18 is provided with lugs 51 and 52 having elongated holes 53 and 54 through which the bolts 48 and 49 pass and which are only slightly wider than the thickness of said bolts. It may thus be seen that this arrangement provides for vertical adjustment of the cellar 18 but prevents its longitudinal displacement and holds the wear plate 34 in the same vertical plane with the wear plate 12.

From the foregoing description the operation and installation of my improved driving box cellar will be readily understood. The cellar is inserted in the driving box by a longitudinal movement with the wedges 39 and 41 slacked off to permit its ready movement into place. The cellar bolts 48 and 49 are next inserted to hold the cellar against longitudinal displacement and the wedges 39 and 41 are adjusted to bring the under bearings 28 and 29 snugly against the journal and against the lower edges of the crown brass 11. Should it be desired at any time to compensate for wear of the under bearings 28 and 29, the cellar is removed in a manner reversed to that to which it is installed and the upper edges 32 and 33 are machined off or filed off the requisite amount. In operation, the grease from the cellar is distributed through the grooves 35 and is carried by the action of the journal up around the crown brass thereby providing a much improved system of lubrication for the journal as well as additional bearing surface therefor. Grease is carried along the under bearings 28 and 29 and lubricates the cellar hub plate 34 from which it is carried around to lubricate the driving box hub plate 12.

It will be apparent therefore that I have provided a cellar which is capable of effecting a longer life for crown brasses and hub wear plates and one which is simple and economical of construction.

While I have shown my invention in but one form, it will be obvious to those skilled in the art that it is not so limited but is susceptible of various changes and modifications without departing from the spirit thereof and I desire therefore that only such limitations shall be placed thereupon as are imposed by the prior art, or as are specifically set forth in the appended claims.

What I claim is:

1. In a locomotive driving box, side portions having longitudinally extending recesses in the inner sides thereof, a cellar having integral upwardly extending portions forming under journal bearings, adjustable wedge means disposed within the recesses and supporting the cellar, said cellar having overhanging lateral shoulders resting on the wedge means, a cellar bolt extending transversely of the driving box and spanning the lower end of the driving box jaws, and lugs on the bottom of the cellar and having elongated vertically extending holes therein through which the cellar bolt passes, said bolt having a snug lateral fit with respect to the holes.

2. In combination with a locomotive driving box having a load sustaining crown brass and hub wear plate and a cellar having force feed grease supply means, lateral upwardly extending under journal bearings formed integrally with the cellar and bearing against the lower edges of the crown brass, said under bearings being provided with grooves for the distribution of grease thereto, lateral shoulders formed on the outer sides of the cellar and extending longitudinally thereof, there being recesses in the driving box sides adjacent the shoulders on the cellar, and adjustable wedge means disposed within the recesses in the driving box and supporting the cellar for drawing the upper edges of the underbearings into snug engagement with the lower edges of the crown brass.

3. In a locomotive driving box, a driving box cellar comprising a body portion of non-bearing metal, upwardly extending side portions and an end portion of non-bearing metal, a bearing metal hub face cast integrally on the end portion, and journal underbearings cast integrally on the side portions.

4. In combination with a locomotive driving box having a load sustaining crown brass and hub wear plate, a cellar comprising a body portion having a grease cake cavity, and upwardly extending integral side portions provided with longitudinal dove-tail grooves, journal underbearings having divergent upwardly extending grease distributing grooves formed therein cast on the side portions, and interlocked with the dove tail grooves, and means for maintaining the upper edges of the underbearings in snug engagement with the lower edges of the crown brass.

5. In combination with a locomotive driving box having a load sustaining crown brass and hub wear plate, a cellar comprising a body portion having a grease cake cavity, and upwardly extending integral side portions provided with longitudinal dove-tail grooves, journal underbearings having divergent upwardly extending grease distributing grooves formed therein cast on the side portions and interlocked with the dove tail grooves, longitudinally extending ledges formed on the sides of the driving box, shoulders on the cellar overhanging the ledges, and wedge means cooperating between the ledges and shoulders for maintaining the upper edges of the underbearings in snug engagement with the crown brass.

In testimony whereof I affix by signature.

CHARLES J. SCUDDER.